United States Patent

Ozaki

(10) Patent No.: US 6,690,519 B2
(45) Date of Patent: Feb. 10, 2004

(54) HIGH-MAGNIFICATION ZOOM LENS SYSTEM

(75) Inventor: Hiroyasu Ozaki, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/229,131

(22) Filed: Aug. 28, 2002

(65) Prior Publication Data
US 2003/0151828 A1 Aug. 14, 2003

(30) Foreign Application Priority Data
Aug. 29, 2001 (JP) ........................... 2001-259448

(51) Int. Cl.$^7$ .............................. G02B 15/14
(52) U.S. Cl. .................. 359/676; 359/683; 359/684
(58) Field of Search ................. 359/676, 683, 359/684, 685

(56) References Cited

U.S. PATENT DOCUMENTS

| | | | | |
|---|---|---|---|---|
| 4,437,732 A | * | 3/1984 | Ishiyama | 359/685 |
| 5,956,184 A | | 9/1999 | Sato | 359/683 |
| 6,094,312 A | * | 7/2000 | Nakayama | 359/676 |
| 6,147,810 A | * | 11/2000 | Misaka | 359/684 |

FOREIGN PATENT DOCUMENTS

| | | |
|---|---|---|
| JP | 1-191819 | 8/1989 |
| JP | 10133109 | 5/1998 |

* cited by examiner

Primary Examiner—Jordan M. Schwartz
(74) Attorney, Agent, or Firm—Greenblum & Bernstein, P.L.C.

(57) ABSTRACT

A high-magnification zoom lens system includes a positive first lens group, a negative second lens group, a positive third lens group, a negative fourth lens group, and a positive fifth lens group. Upon zooming from the short focal length extremity to the long focal length extremity, at least the positive first lens group, the positive third lens group, the negative fourth lens group, and the positive fifth lens group move from the image side toward the object side. The high-magnification zoom lens system satisfies the following conditions: $0.65<(fw*ft)^{1/2}/f1<0.95$ ... (1); $-7.0<(fw*ft)^{1/2}/f2<-4.8$ ... (2); $0.80<X4/X5<0.95$ ... (3); wherein fw: the focal length of the entire high-magnification zoom lens system at the short focal length extremity; ft: the focal length of the entire high-magnification zoom lens system at the long focal length extremity; f1: the focal length of the positive first lens group; f2: the focal length of the negative second lens group; X4: the traveling distance of the negative fourth lens group upon zooming from the short focal length extremity to the long focal length extremity; and X5: the traveling distance of the positive fifth lens group upon zooming from the short focal length extremity to the long focal length extremity.

5 Claims, 14 Drawing Sheets

Fig. 1
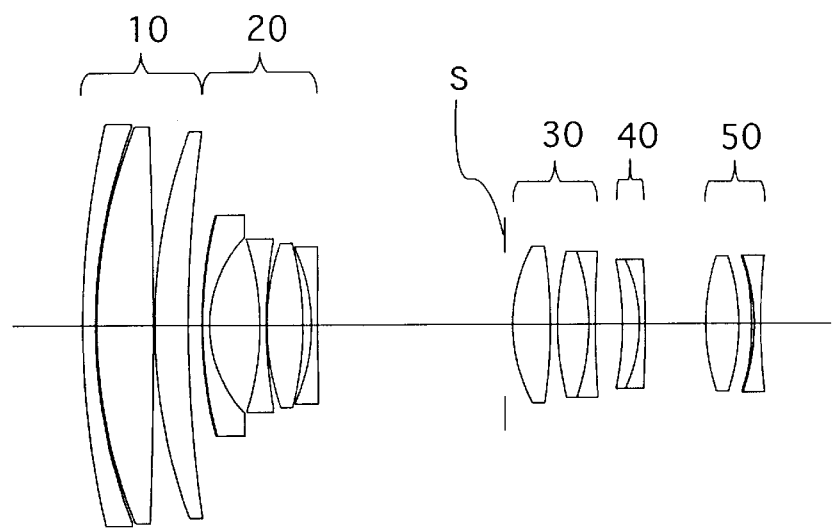
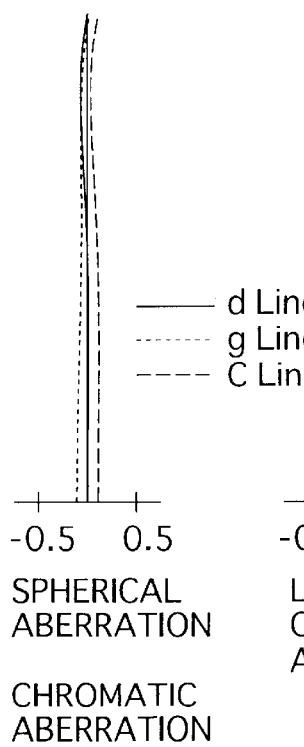
Fig. 2A
Fno.=1:3.4
——— d Line
------- g Line
---- C Line
-0.5  0.5
SPHERICAL
ABERRATION
CHROMATIC
ABERRATION
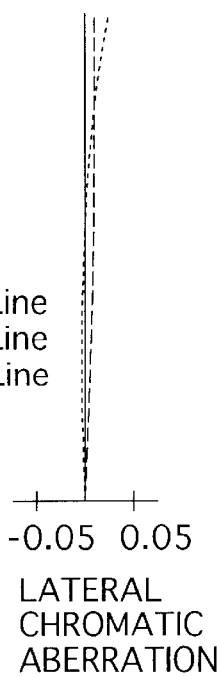
Fig. 2B
W=38.0
-0.05  0.05
LATERAL
CHROMATIC
ABERRATION
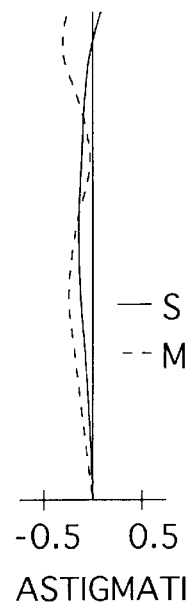
Fig. 2C
W=38.0
— S
-- M
-0.5  0.5
ASTIGMATISM
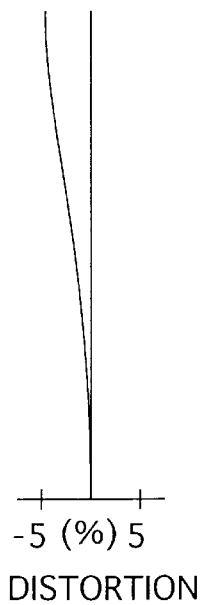
Fig. 2D
W=38.0
-5 (%) 5
DISTORTION Fno.=1:5.1

-0.5  0.5
SPHERICAL
ABERRATION

CHROMATIC
ABERRATION d Line
g Line
C Line

W=15.5

-0.05  0.05
LATERAL
CHROMATIC
ABERRATION

W=15.5

-0.5  0.5
ASTIGMATISM

— S
-- M

W=15.5

-5 (%) 5
DISTORTION

Fno.=1:6.2

-0.5  0.5
SPHERICAL
ABERRATION

CHROMATIC
ABERRATION d Line
g Line
C Line

W=4.1

-0.05  0.05
LATERAL
CHROMATIC
ABERRATION

W=4.1

-0.5  0.5
ASTIGMATISM

— S
-- M

W=4.1

-5 (%) 5
DISTORTION

Fig. 5
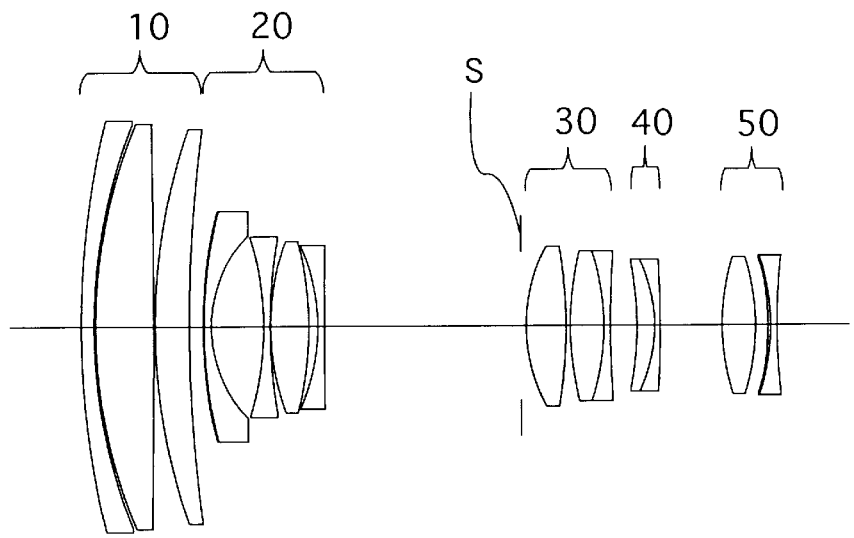
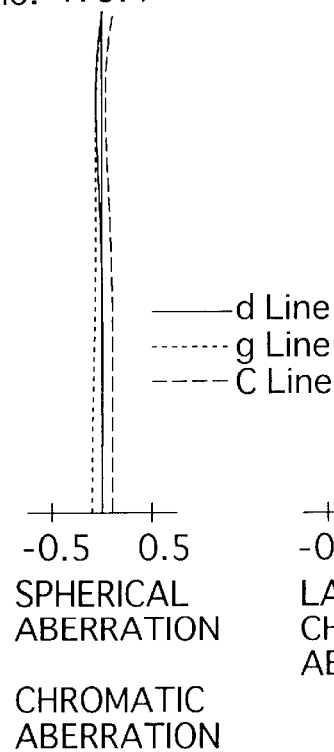
Fig. 6A
Fno.=1:3.4
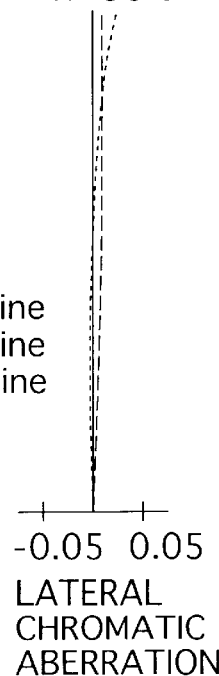
Fig. 6B
W=38.0
—— d Line
······· g Line
---- C Line
-0.5  0.5
SPHERICAL
ABERRATION
CHROMATIC
ABERRATION
-0.05  0.05
LATERAL
CHROMATIC
ABERRATION
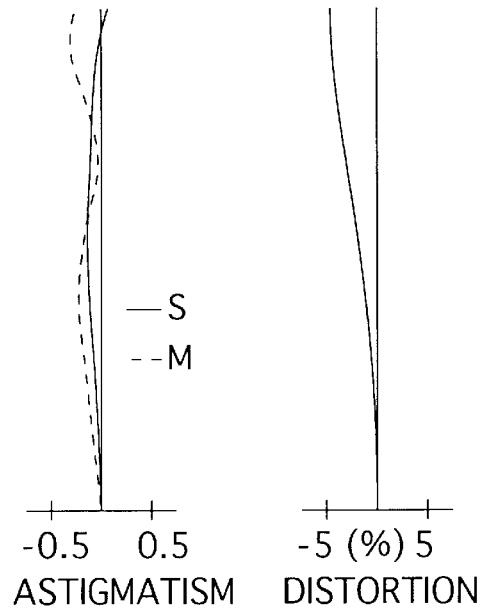
Fig. 6C
W=38.0
—— S
-- M
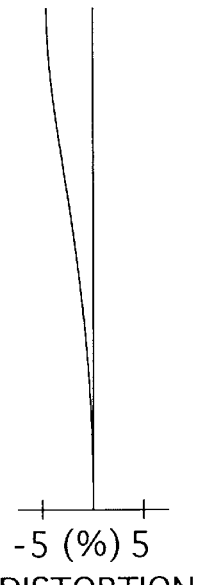
Fig. 6D
W=38.0
-0.5  0.5
ASTIGMATISM
-5 (%) 5
DISTORTION Fno.=1:5.1
-0.5  0.5
SPHERICAL ABERRATION
CHROMATIC ABERRATION
— d Line
······ g Line
---- C Line

W=15.5
-0.05  0.05
LATERAL CHROMATIC ABERRATION

W=15.5
-0.5  0.5
ASTIGMATISM
— S
-- M

W=15.5
-5 (%) 5
DISTORTION

Fno.=1:6.2
-0.5  0.5
SPHERICAL ABERRATION
CHROMATIC ABERRATION
— d Line
······ g Line
---- C Line

W=4.1
-0.05  0.05
LATERAL CHROMATIC ABERRATION

W=4.1
-0.5  0.5
ASTIGMATISM
— S
-- M

W=4.1
-5 (%) 5
DISTORTION

Fno.=1:3.5  W=38.1  W=38.1  W=38.1

—— d Line
------ g Line
---- C Line

— S
-- M

-0.5  0.5
SPHERICAL
ABERRATION
CHROMATIC
ABERRATION

-0.05  0.05
LATERAL
CHROMATIC
ABERRATION

-0.5  0.5
ASTIGMATISM

-5 (%) 5
DISTORTION

Fno.=1:5.4

-0.5  0.5
SPHERICAL
ABERRATION

CHROMATIC
ABERRATION

W=13.8

— d Line
······ g Line
---- C Line

-0.05  0.05
LATERAL
CHROMATIC
ABERRATION

W=13.8

— S
-- M

-0.5  0.5
ASTIGMATISM

W=13.8

-5 (%) 5
DISTORTION

Fno.=1:6.3

-0.5  0.5
SPHERICAL
ABERRATION

CHROMATIC
ABERRATION

W=4.1

— d Line
······ g Line
---- C Line

-0.05  0.05
LATERAL
CHROMATIC
ABERRATION

W=4.1

— S
-- M

-0.5  0.5
ASTIGMATISM

W=4.1

-5 (%) 5
DISTORTION

Fno.=1:3.4

-0.5  0.5
SPHERICAL
ABERRATION
CHROMATIC
ABERRATION

—— d Line
········ g Line
---- C Line

W=38.0

-0.05  0.05
LATERAL
CHROMATIC
ABERRATION

W=38.0

-0.5  0.5
ASTIGMATISM

—— S
-- M

W=38.0

-5 (%) 5
DISTORTION

Fno.=1:5.2

-0.5   0.5
SPHERICAL
ABERRATION

CHROMATIC
ABERRATION

W=13.8

——— d Line
------- g Line
---- C Line

-0.05  0.05
LATERAL
CHROMATIC
ABERRATION

W=13.8

— S
-- M

-0.5   0.5
ASTIGMATISM

W=13.8

-5 (%) 5
DISTORTION

Fno.=1:6.2

——— d Line
------- g Line
---- C Line

-0.5   0.5
SPHERICAL
ABERRATION

CHROMATIC
ABERRATION

W=4.1

-0.05  0.05
LATERAL
CHROMATIC
ABERRATION

W=4.1

— S
-- M

-0.5   0.5
ASTIGMATISM

W=4.1

-5 (%) 5
DISTORTION

Fig. 17
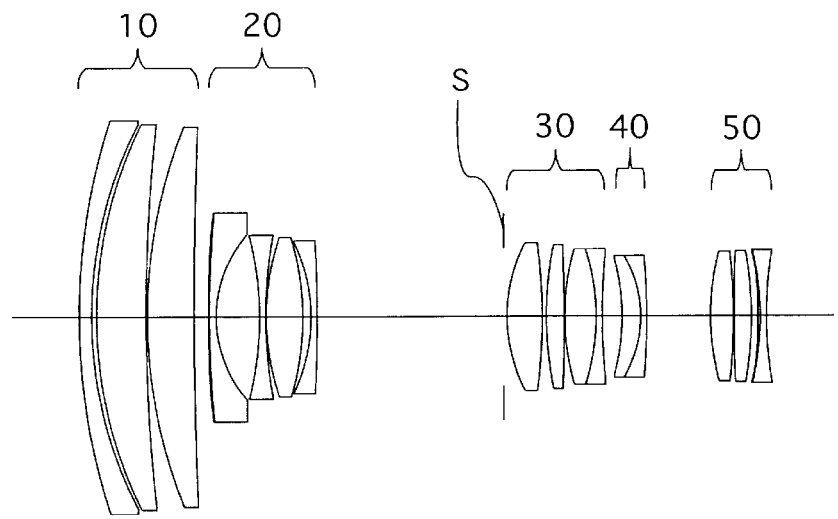
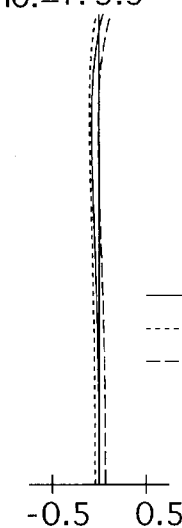
Fig. 18A
Fno.=1:3.5
—— d Line
------ g Line
---- C Line
-0.5　0.5
SPHERICAL
ABERRATION
CHROMATIC
ABERRATION
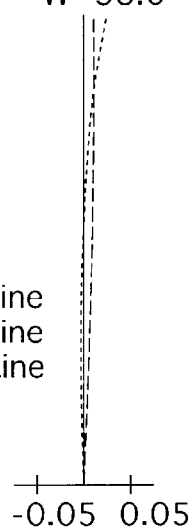
Fig. 18B
W=38.0
-0.05　0.05
LATERAL
CHROMATIC
ABERRATION
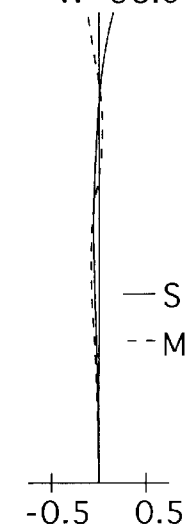
Fig. 18C
W=38.0
— S
-- M
-0.5　0.5
ASTIGMATISM
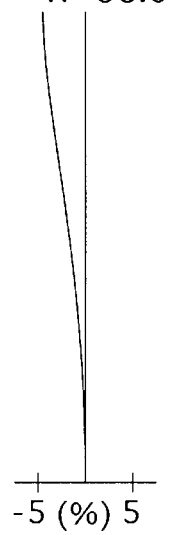
Fig. 18D
W=38.0
-5 (%) 5
DISTORTION Fno.=1:5.4

-0.5  0.5
SPHERICAL
ABERRATION

CHROMATIC
ABERRATION

— d Line
······· g Line
---- C Line

W=13.8

-0.05  0.05
LATERAL
CHROMATIC
ABERRATION

W=13.8

— S
-- M

-0.5  0.5
ASTIGMATISM

W=13.8

-5 (%) 5
DISTORTION

Fno.=1:6.2

-0.5  0.5
SPHERICAL
ABERRATION

CHROMATIC
ABERRATION

— d Line
······· g Line
---- C Line

W=4.1

-0.05  0.05
LATERAL
CHROMATIC
ABERRATION

W=4.1

— S
-- M

-0.5  0.5
ASTIGMATISM

W=4.1

-5 (%) 5
DISTORTION

Fno.=1:3.5

——— d Line
······· g Line
----- C Line

-0.5   0.5
SPHERICAL
ABERRATION
CHROMATIC
ABERRATION

W=37.9

-0.05  0.05
LATERAL
CHROMATIC
ABERRATION

W=37.9

— S
-- M

-0.5   0.5
ASTIGMATISM

W=37.9

-5 (%) 5
DISTORTION

Fno.=1:5.5

-0.5  0.5
SPHERICAL
ABERRATION

CHROMATIC
ABERRATION

W=13.8

— d Line
······ g Line
---- C Line

-0.05  0.05
LATERAL
CHROMATIC
ABERRATION

W=13.8

— S
-- M

-0.5  0.5
ASTIGMATISM

W=13.8

-5 (%) 5
DISTORTION

Fno.=1:6.3

— d Line
······ g Line
---- C Line

-0.5  0.5
SPHERICAL
ABERRATION

CHROMATIC
ABERRATION

W=4.1

-0.05  0.05
LATERAL
CHROMATIC
ABERRATION

W=4.1

— S
-- M

-0.5  0.5
ASTIGMATISM

W=4.1

-5 (%) 5
DISTORTION

HIGH-MAGNIFICATION ZOOM LENS SYSTEM

BACKGROUND OF THE INVENTION

1. Field of the Invention

The present invention relates to a zoom lens system, and in particular, relates to a high-magnification zoom lens system which is suitable for an interchangeable lens system of an SLR camera, and has an zoom ratio of about 10.

2. Description of the Prior Art

A zoom lens system having a zoom ratio of about 10 proposed in, for example, Japanese Unexamined Patent Publication No. 1-191819, includes a positive first lens group, a negative second lens group, a positive third lens group, a negative fourth lens group, and a positive fifth lens group, in this order from the object. In this high-magnification zoom lens system, the negative second lens group and the positive fifth lens group remain stationary upon zooming, and the overall length of the zoom lens system is long. Furthermore, the angle of view 2ω at the short focal length extremity is small to the extent of about 62°.

Japanese Unexamined Patent Publication No. 10-133109 also proposes a zoom lens system which also includes a positive first lens group, a negative second lens group, a positive third lens group, a negative fourth lens group, and a positive fifth lens group, in this order from the object. In this five-lens-group zoom lens system, all of the lens groups move upon zooming, and the traveling distance of the first lens group is long, which is disadvantageous for miniaturization of the zoom lens system.

SUMMARY OF THE INVENTION

The present invention provides a high-magnification zoom lens system which has a short overall length, achieves a zoom ratio of about 10, and has an angle of view 2ω of about 76°.

As an aspect of the present invention, there is provided a high-magnification zoom lens system including a positive first lens group, a negative second lens group, a positive third lens group, a negative fourth lens group, and a positive fifth lens group, in this order from the object. Upon zooming from the short focal length extremity to the long focal length extremity, at least the positive first lens group, the positive third lens group, the negative fourth lens group, and the positive fifth lens group move from the image side toward the object side. Furthermore, the high-magnification zoom lens system satisfies the following conditions:

$$0.65<(fw*ft)^{1/2}/f1<0.95 \quad (1)$$

$$-7.0<(fw*ft)^{1/2}/f2<-4.8 \quad (2)$$

$$0.80<X4/X5<0.95 \quad (3)$$

wherein fw designates the focal length of the entire high-magnification zoom lens system at the short focal length extremity;

ft designates the focal length of the entire high-magnification zoom lens system at the long focal length extremity;

f1 designates the focal length of the positive first lens group;

f2 designates the focal length of the negative second lens group;

X4 designates the traveling distance of the negative fourth lens group upon zooming from the short focal length extremity to the long focal length extremity; and X5 designates the traveling distance of the positive fifth lens group upon zooming from the short focal length extremity to the long focal length extremity.

The high-magnification zoom lens system preferably satisfies the following condition:

$$0<(L_{(1-3)W}+X3-X1)/fw<0.3 \quad (4)$$

wherein $L_{(1-3)W}$ designates the distance from the most image-side surface of the positive first lens group to the most object-side surface of the positive third lens group, at the short focal length extremity;

X3 designates the traveling distance of the positive third lens group upon zooming from the short focal length extremity to the long focal length extremity; and X1 designates the traveling distance of the positive first lens group upon zooming from the short focal length extremity to the long focal length extremity.

The high-magnification zoom lens system performs focusing from an object at infinity to a close-distance object by moving the negative second lens group toward the object, and satisfies the following conditions:

$$0.75<|m2t|<1.0 \quad (5)$$

$$0.05<D_{1W}/fw<0.10 \quad (6)$$

wherein m2t designates the lateral magnification of the negative second lens group at the long focal length extremity;

fw designates the focal length of the entire high-magnification zoom lens system at the short focal length extremity; and $D_{1W}$ designates the air distance between the positive first lens group and the negative second lens group at the short focal length extremity.

In order to correct aberrations, the high-magnification zoom lens system preferably includes a lens element on which an aspherical surface is formed in at least two of the negative second lens group, the positive third lens group and the positive fifth lens group. Providing aspherical surfaces in these lens groups enables the correcting of aberrations in an effective manner, and can reduced the number of lens elements.

The high-magnification zoom lens system preferably satisfies the following conditions:

$$1.0<f3*N_{3-1}/R_{3-1}<2.0 \quad (7)$$

$$62<\nu_{3-1} \quad (8)$$

wherein f3 designates the focal length of the positive third lens group;

$N_{3-1}$ designates the refractive index, with respect to the d-line, of the most object-side lens element of the positive third lens group;

$R_{3-1}$ designates the radius of curvature of the most object-side lens element of the positive third lens group; and $\nu_{3-1}$ designates the Abbe number of the most object-side lens element of the positive third lens group.

The present disclosure relates to subject matter contained in Japanese Patent Application No. 2001-259448 (filed on Aug. 29, 2001) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of a high-magnification zoom lens system at the short focal length extremity, according to a first embodiment of the present invention;

FIGS. 2A, 2B, 2C and 2D show aberrations occurred in the lens arrangement shown in FIG. 1;

FIG. 5 is a lens arrangement of a high-magnification zoom lens system at the short focal length extremity, according to a second embodiment of the present invention;

FIGS. 6A, 6B, 6C and 6D show aberrations occurred in the lens arrangement shown in FIG. 5;

FIG. 17 is a lens arrangement of a high-magnification zoom lens system at the short focal length extremity according to a fifth embodiment of the present invention;

FIGS. 18A, 18B, 18C and 18D show aberrations occurred in the lens arrangement shown in FIG. 17;

DESCRIPTION OF THE PREFERRED EMBODIMENTS

Figure 25:
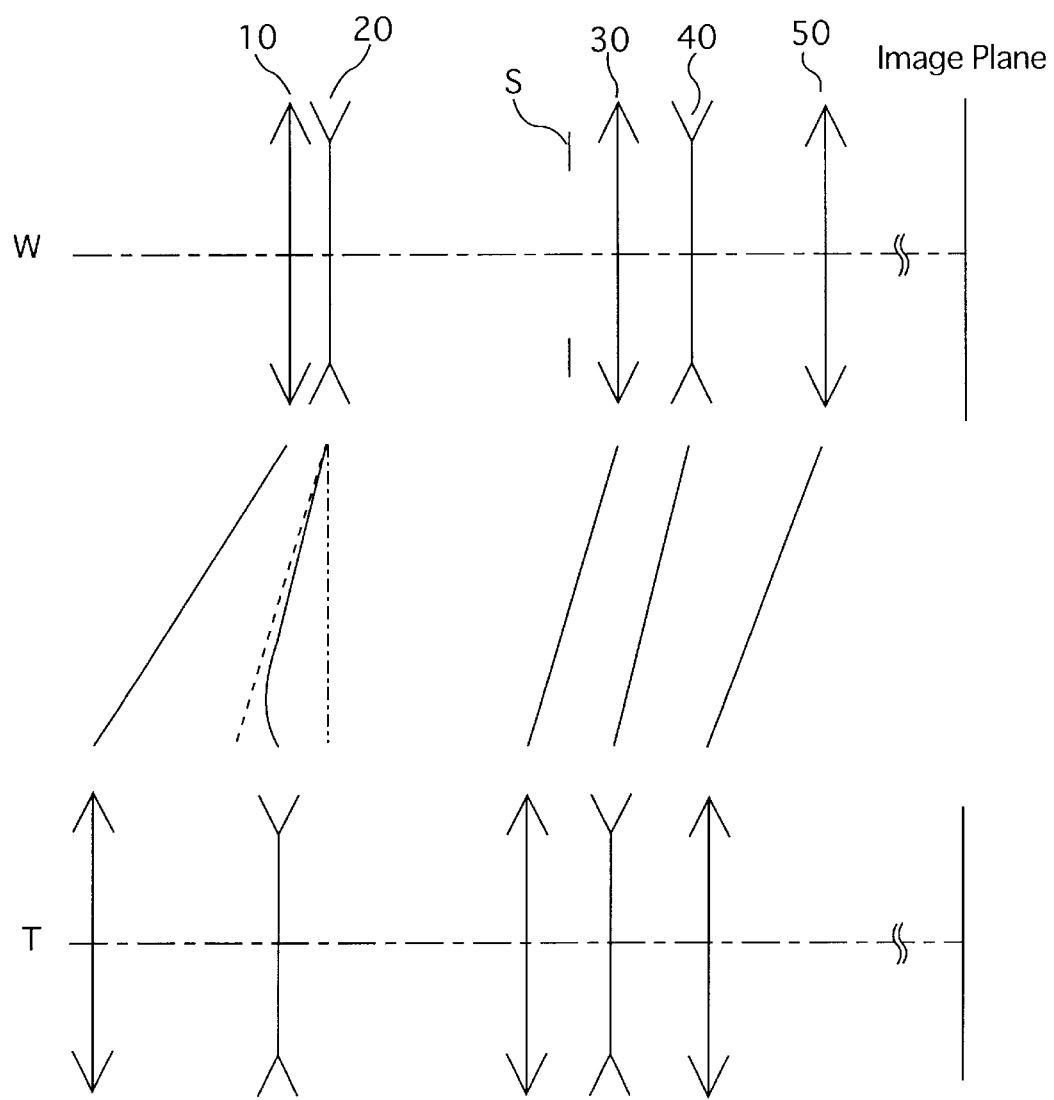
FIG. 25 shows a schematic lens-group moving paths of the zoom lens system according to the present invention.

The high-magnification zoom lens system of the present invention, as shown in FIG. 25, includes a positive first lens group 10, a negative second lens group 20, a positive third lens group 30, a negative fourth lens group 40, and a positive fifth lens group 50, in this order from the object. At least the positive first lens group 10, the positive third lens group 30, the negative fourth lens group 40, and the positive fifth lens group 50 move from the image side to the object side upon zooming from the short focal length extremity to the long focal length extremity.

If the positive fifth lens group 50 is moved upon zooming, the overall length of the zoom lens system can be reduced, compared with a case where the positive fifth lens group 50 is stationary; furthermore, the amount of change in field curvature upon zooming can be made smaller, and peripheral illumination can be adequately collected on the side of the long focal length.

Upon zooming from the short focal length extremity to the long focal length extremity, the negative second lens group 20 can be moved along the following moving-paths, as shown in FIG. 25:

(i) as shown by a dotted line, the negative second lens group 20 moves from the image side toward the object side;

(ii) as shown by a solid line, the negative second lens group 20 moves from the image side toward the object side and thereafter moves back (U-turns) toward the image side; and (iii) as shown by a single-dot chain line, the negative second lens group 20 does not move.

A diaphragm S is provided between the negative second lens group 20 and the positive third lens group 30, and moves together with the positive third lens group 30.

Focusing on object at infinity through to a close-distance object is performed by moving the negative second lens group 20 toward the object.

Condition (1) specifies the power of the positive first lens group 10.

If $(fw*ft)^{1/2}/f1$ exceeds the lower limit of condition (1), the power of the positive first lens group 10 becomes too weak, so that the overall length of the high-magnification zoom lens system becomes longer, or the traveling distance of the positive first lens group 10 upon zooming becomes longer. Consequently, miniaturization of the high-magnification zoom lens system becomes difficult.

If $(fw*ft)^{1/2}/f1$ exceeds the upper limit of condition (1), the power of the positive first lens group 10 becomes too strong, so that aberrations such as spherical aberration and coma in the positive first lens group 10 increase. Consequently, the correcting of aberrations in a well balanced manner becomes difficult.

Furthermore, according to the following condition (1'), a more desirable power for the positive first lens group 10 can be determined. By satisfying this condition, the traveling distance of the positive first lens group 10 can be shorter $$0.70 < (fw*ft)^{1/2}/f1 < 0.95 \qquad (1')$$

Condition (2) specifies the power of the negative second lens group 20.

If $(fw*ft)^{1/2}/f2$ exceeds the upper limit of condition (2), the negative power of the second lens group 20 becomes too small, so that the traveling distance of the negative second lens group 20 becomes longer in order to obtain a necessary zoom ratio. As a result, the overall length of the high-magnification zoom lens system at the long focal length extremity becomes longer.

If $(fw*ft)^{1/2}/f2$ exceeds the lower limit of condition (2), the negative power of the second lens group becomes too strong, so that the Petzval Sum increases in the negative direction. Consequently, it becomes difficult to adequately correct field curvature.

Furthermore, according to the following condition (2'), a more desirable power for the negative second lens group 20 can be determined. By satisfying this condition, the traveling distance of the negative second lens group 20 can be further reduced.

$$-7.0 < (fw*ft)^{1/2}/f2 < -5.0 \qquad (2')$$

Condition (3) specifies the ratio of the traveling distance of the negative fourth lens group 40 to that of the positive fifth lens group 50.

If X4/X5 exceeds the lower limit of condition (3), the traveling distance of the positive fifth lens group 50 becomes relatively longer with respect to that of the negative fourth lens group 40, which is advantageous for sharing the zooming effect. However, the distance between the negative fourth lens group 40 and the positive fifth lens group 50 becomes longer at the short focal length extremity, so that the overall length of the high-magnification zoom lens system cannot be shortened.

If X4/X5 exceeds the upper limit of condition (3), the ratio of the traveling distance of the negative fourth lens group 40 to that of the positive fifth lens group 50 becomes close to 1.0, so that the sharing effect on the correcting of aberrations weakens, and fluctuation of field curvature upon zooming cannot be adequately corrected.

Furthermore, according to the following condition (3'), a more desirable ratio of the traveling distance of the negative fourth lens group 40 to that of the positive fifth lens group 50 can be determined. By satisfying this condition, the overall length of the high-magnification zoom lens system, especially at the short focal length extremity, can be made shorter.

$$0.83 < X4/X5 < 0.95 \qquad (3')$$

Condition (4) specifies the traveling distances of the positive first lens group 10 and the positive third lens group 30, and the distance between the positive first lens group 10 and the positive third lens group 30 at the short focal length extremity.

Figure 26:
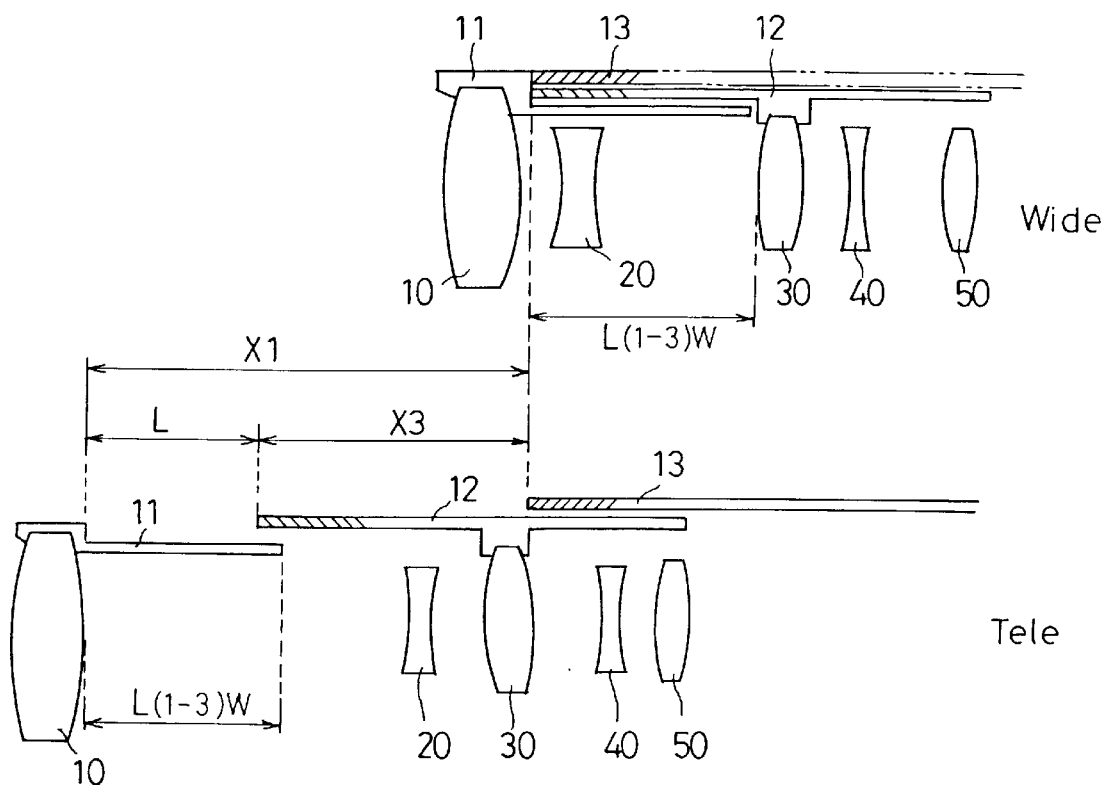
FIG. 26 is a diagram to explain condition (4).

FIG. 26 shows a lens barrel to which condition (4) is applied. The positive first lens group 10 is fixed to a first movable frame 11, and the positive third lens group 30 is fixed to a second movable frame 12. The first and second movable frames 11 and 12 are linearly movable with respect to a stationary frame 13. The support (guiding) devices for the negative second lens group 20, the negative fourth lens group 40 and the positive fifth lens group 50 can be any appropriate device.

At the short focal length extremity, both the first and second movable frames 11 and 12 are retracted as much as possible (up to the retracting limit) into the stationary frame 13. When the high-magnification zoom lens system is moved from the short focal length extremity to the long focal length extremity, the second movable frame 12 advances with respect to the stationary frame 13 by a distance X3, and the first movable frame 11 advances with respect to the second movable frame 12 by a distance L.

Here, it should be noted that the maximum value of L is substantially equal to a distance $(L_{(1-3)w})$ between the positive first lens group 10 and the positive third lens group 30 at the short focal length extremity. Accordingly, in order to achieve the lens barrel mechanism of FIG. 26, the following equation needs to be satisfied:

$$X1 < L_{(1-3)w} + X3.$$

Accordingly, condition (4) is to normalize $(L_{(1-3)w}+X3-X1)$ by dividing this formula by fw (i.e., the focal length of the entire high-magnification zoom lens system at the short focal length extremity) in order to set suitable upper and lower limits.

If $(L_{(1-3)w}+X3-X1)/fw$ exceeds the lower limit of condition (4), the traveling distance of the positive first lens group 10 becomes relatively too long with respect to the positive third lens group 30. Consequently, the lens frame mechanism for moving the positive first lens group 10 upon zooming from the short focal length extremity to the long focal length extremity becomes complicated.

If $(L_{(1-3)w}+X3-X1)/fw$ exceeds the upper limit of condition (4), the air distance between the positive first lens group 10 and the positive third lens group 30 at the short focal length extremity becomes longer. As a result, the overall length of the high-magnification zoom lens system at the short focal length extremity cannot be made shorter, or the traveling distance of the positive third lens group 30 becomes longer, so that the change in the f-number upon zooming becomes too large.

Condition (5) specifies the lateral magnification of the negative second lens group 20 at the long focal length extremity.

If $|m2t|$ exceeds the lower limit of condition (5), the zooming effect by the negative second lens group 20 becomes insufficient, so that it becomes difficult to obtain a necessary zoom ratio.

If $|m2t|$ exceeds the upper limit of condition (5), the sign of the focus-sensitivity upon focusing is reversed at the long focal length side and the short focal length side, respectively, so that at a specific focal length, focusing cannot be performed only by the negative second lens group 20.

Condition (6) specifies the distance between the positive first lens group 10 and the negative second lens group 20 at the short focal length extremity.

If $D_{1w}/fw$ exceeds the lower limit of condition (6), the distance between the positive first lens group 10 and the negative second lens group 20 at the short focal length extremity becomes too short, so that a necessary traveling distance of the negative second lens group 20 for focusing on a close-distance object cannot be secured.

If $D_{1w}/fw$ exceeds the upper limit of condition (6), the distance between the positive first lens group 10 and the negative second lens group 20 at the short focal length extremity becomes too long, so that the diameter of the positive first lens group 10 becomes larger.

Condition (7) specifies the power of the most object-side surface of the positive third lens group 30.

If $f3*N_{3-1}/R_{3-1}$ exceeds the lower limit of condition (7), the power of the most object-side surface of the positive third lens group 30 becomes too weak, so that the diverging light rays which exit from the negative second lens group 20 cannot sufficiently be converged, and the diameter of the positive third lens group 30 becomes larger.

If $f3*N_{3-1}/R_{3-1}$ exceeds the upper limit of condition (7), the power of the most object-side surface of the positive third lens group 30 becomes too strong, so that error-sensitivity on decentration, such as a tilt of a lens surface and the like, becomes extremely noticeable.

Condition (8) specifies the Abbe number of the most object-side lens of the positive third lens group 30.

If $v_{3-1}$ exceeds the lower limit of condition (8), the Abbe number becomes too small, so that the correcting of axial chromatic aberration becomes difficult.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, $F_{NO}$ designates the f-number, f designates the focal length of the entire zoom lens system, $f_B$ designates the back focal distance, W designates the half angle-of-view (°), r designates the radius of curvature, d designates the lens-element thickness or distance between lens elements, $N_d$ designates the refractive index of the d-line, and $v_d$ designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

FIG. 1 is a lens arrangement of a high-magnification zoom lens system at the short focal length extremity, according to the first embodiment of the present invention.

FIGS. 2A through 2D show aberrations occurred in the lens arrangement shown in FIG. 1. FIGS. 3A through 3D show aberrations occurred in the lens arrangement shown in FIG. 1 at an intermediate focal length. FIGS. 4A through 4D show aberrations occurred in the lens arrangement shown in FIG. 1 at the long focal length extremity. Table 1 shows the numerical values of the first embodiment.

Surface Nos. 1 through 6 constitute the positive first lens group 10; surface Nos. 7 through 15 constitute the negative second lens group 20; surface Nos. 16 through 20 constitute the positive third lens group 30; surface Nos. 21 through 23 constitute the negative fourth lens group 40; and surface Nos. 24 through 28 constitute the positive fifth lens group 50.

An aspherical surface is formed on a lens element in each of the negative second lens group 20, the positive third lens group 30 and the positive fifth lens group 50. The diaphragm S is provided 1.10 in front (object side) of the third lens group 30 (surface No. 16), and moves integrally with the positive third lens group 30 upon zooming.

In the first embodiment, upon zooming from the short focal length extremity to the long focal length extremity, the negative second lens group 20 first moves toward the object and thereafter moves back (U-turns) toward the image. Focusing can be performed by moving the negative second lens group 20 along the optical axis.

TABLE 1

| Surface No. | r | d | $N_d$ | $v_d$ |
|---|---|---|---|---|
| 1 | 128.146 | 1.80 | 1.84666 | 23.8 |
| 2 | 79.406 | 0.20 | — | — |
| 3 | 76.212 | 8.07 | 1.49700 | 81.6 |
| 4 | −806.955 | 0.20 | — | — |
| 5 | −79.792 | 4.78 | 1.72916 | 54.7 |
| 6 | 190.480 | 1.97-26.23-68.75 | — | — |
| 7* | 69.580 | 0.10 | 1.52700 | 43.7 |
| 8 | 62.656 | 1.00 | 1.83481 | 42.7 |
| 9 | 18.234 | 7.20 | — | — |
| 10 | −40.346 | 0.90 | 1.77250 | 49.6 |
| 11 | 67.752 | 0.10 | — | — |
| 12 | 35.338 | 5.25 | 1.84666 | 23.8 |
| 13 | −45.036 | 1.23 | — | — |
| 14 | −26.795 | 0.90 | 1.81600 | 46.6 |
| 15 | 9255.889 | 27.91-15.21-3.06 | — | — |
| 16 | 23.562 | 5.41 | 1.61800 | 63.4 |
| 17 | −71.781 | 0.99 | — | — |
| 18* | 39.030 | 4.50 | 1.58636 | 60.9 |
| 19 | −31.856 | 0.90 | 1.84666 | 23.8 |
| 20 | 142.435 | 3.88-5.41-5.89 | — | — |
| 21 | −46.020 | 2.46 | 1.80518 | 25.4 |
| 22 | −21.747 | 0.80 | 1.80400 | 46.6 |
| 23 | −170.299 | 8.70-3.06-0.90 | — | — |
| 24 | 30.655 | 4.77 | 1.53172 | 48.9 |
| 25 | −30.655 | 1.83 | — | — |
| 26* | −46.552 | 0.40 | 1.52700 | 43.7 |
| 27 | −28.950 | 0.90 | 1.83481 | 42.7 |
| 28 | 88.873 | — | — | — |

$F_{NO}$ = 1:3.4 - 5.1 - 6.2
f = 29.00 - 75.00 - 290.00 (Zoom Ratio = 10.0)
W = 38.0 - 15.5 - 4.1
$f_B$ = 38.65 - 70.21 - 90.52
*designates the aspherical surface which is rotationally symmetrical with respect to the optical axis.

Aspherical surface data (the aspherical surface coefficients not indicated are zero (0.00)):

| Surface No. | K | A4 | A6 | A8 | A10 |
|---|---|---|---|---|---|
| 7 | 0.00 | $0.27479 \times 10^{-5}$ | $-0.12214 \times 10^{-7}$ | $-0.32474 \times 10^{-10}$ | $-0.70083 \times 10^{-13}$ |
| 18 | 0.00 | $-0.86221 \times 10^{-5}$ | $-0.11082 \times 10^{-7}$ | $-0.66653 \times 10^{-10}$ | $-0.21364 \times 10^{-12}$ |
| 26 | 0.00 | $-0.47686 \times 10^{-4}$ | $-0.85624 \times 10^{-7}$ | $0.28035 \times 10^{-9}$ | $-0.31648 \times 10^{-12}$ |

[Embodiment 2]

FIG. 5 is a lens arrangement of a high-magnification zoom lens system at the short focal length extremity, according to the second embodiment of the present invention. FIGS. 6A through 6D show aberrations occurred in the lens arrangement shown in FIG. 5. FIGS. 7A through 7D show aberrations occurred in the lens arrangement shown in FIG. 5 at an intermediate focal length. FIGS. 8A through 8D show aberrations occurred in the lens arrangement shown in FIG. 5 at the long focal length extremity. Table 2 shows the numerical values of the second embodiment. The basic lens arrangement of the second embodiment is the same as the first embodiment except that the negative second lens group 20 monotonously moves toward the object upon zooming.

An aspherical lens surface is provided in each of the negative second lens group 20, the positive third lens group 30 and the positive fifth lens group 50. The diaphragm S is provided 0.70 in front (object side) of the third lens group 30 (surface No. 16).

TABLE 2

| Surface No. | r | d | $N_d$ | $v_d$ |
|---|---|---|---|---|
| 1 | 119.092 | 1.80 | 1.84666 | 23.8 |
| 2 | 79.058 | 0.24 | — | — |
| 3 | 72.983 | 8.04 | 1.49700 | 81.6 |
| 4 | −1587.356 | 0.20 | — | — |
| 5 | 82.558 | 4.76 | 1.72916 | 54.7 |
| 6 | 202.509 | 1.96-26.73-69.14 | — | — |
| 7* | 73.232 | 0.10 | 1.52700 | 43.7 |
| 8 | 66.041 | 1.00 | 1.83481 | 42.7 |
| 9 | 18.459 | 7.26 | — | — |
| 10 | −42.694 | 0.90 | 1.77250 | 49.6 |
| 11 | 68.491 | 0.10 | — | — |
| 12 | 34.917 | 5.35 | 1.84666 | 23.8 |
| 13 | −46.673 | 1.27 | — | — |
| 14 | −27.337 | 0.90 | 1.81600 | 46.6 |
| 15 | 902.144 | 28.09-15.27-2.95 | — | — |
| 16 | 23.360 | 5.52 | 1.61800 | 63.4 |
| 17 | −68.725 | 0.60 | — | — |
| 18* | 39.295 | 4.74 | 1.58913 | 61.2 |
| 19 | −32.131 | 0.90 | 1.84666 | 23.8 |
| 20 | 134.355 | 3.76-5.24-5.74 | — | — |
| 21 | −43.267 | 2.47 | 1.80518 | 25.4 |
| 22 | −20.932 | 0.80 | 1.80400 | 46.6 |
| 23 | −147.841 | 8.71-3.15-1.00 | — | — |
| 24 | 31.242 | 4.64 | 1.53172 | 48.9 |
| 25 | −31.242 | 1.70 | — | — |
| 26* | −48.586 | 0.40 | 1.52700 | 43.7 |
| 27 | −30.146 | 0.90 | 1.83481 | 42.7 |
| 28 | 85.687 | — | — | — |

$F_{NO}$ = 1:3.4 − 5.1 − 6.2
f = 29.00 − 75.00 − 290.00 (Zoom Ratio = 10.0)
W = 38.0 − 15.5 − 4.1
$f_B$ = 38.60 − 69.64 − 90.38
*designates the aspherical surface which is rotationally symmetrical with respect to the optical axis.

Aspherical surface data (the aspherical surface coefficients not indicated are zero (0.00)):

[Embodiment 3]

Figure 3A:
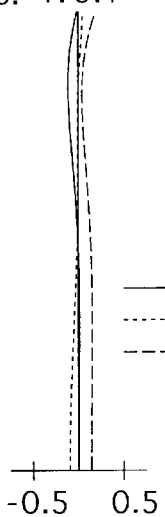
FIGS. 3A, 3B, 3C and 3D show aberrations occurred in the lens arrangement shown in FIG. 1 at an intermediate focal length.
Figure 3B:
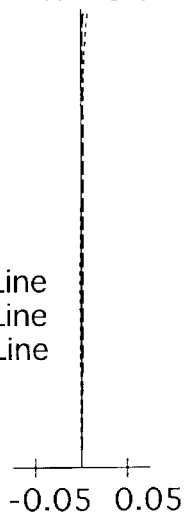
Figure 3C:
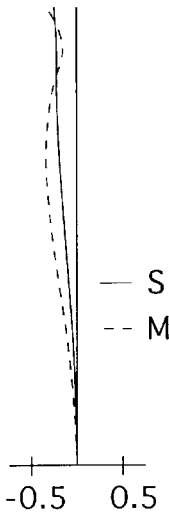
Figure 3D:
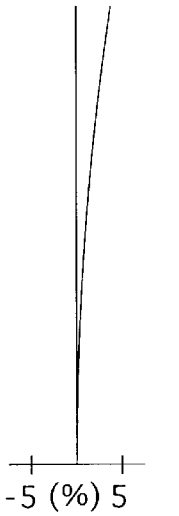
Figure 4A:
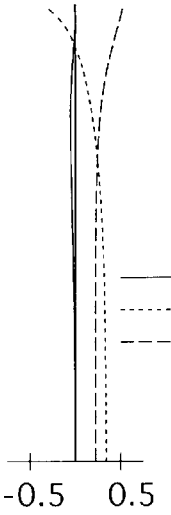
FIGS. 4A, 4B, 4C and 4D show aberrations occurred in the lens arrangement shown in FIG. 1 at the long focal length extremity.
Figure 4B:
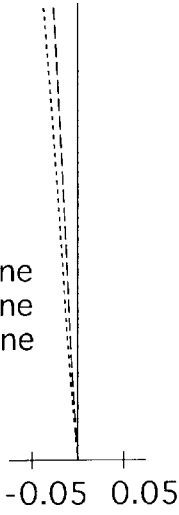
Figure 4C:
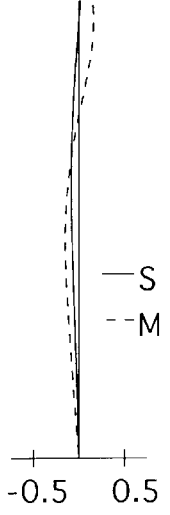
Figure 4D:
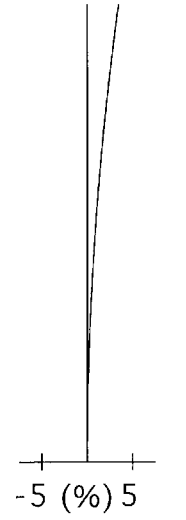
Figure 7A:
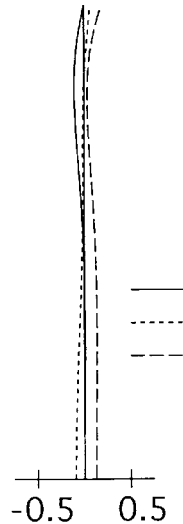
FIGS. 7A, 7B, 7C and 7D show aberrations occurred in the lens arrangement shown in FIG. 5 at an intermediate focal length.
Figure 7B:
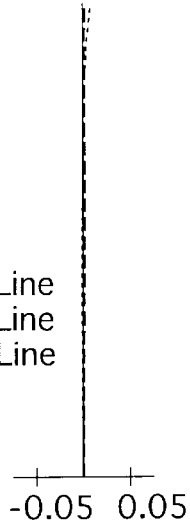
Figure 7C:
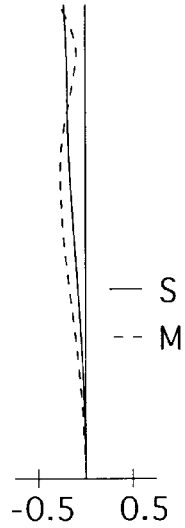
Figure 7D:
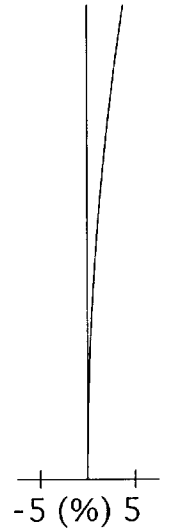
Figure 8A:
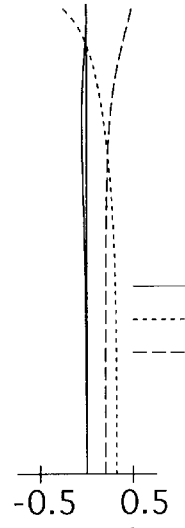
FIGS. 8A, 8B, 8C and 8D show aberrations occurred in the lens arrangement shown in FIG. 5 at the long focal length extremity.
Figure 8B:
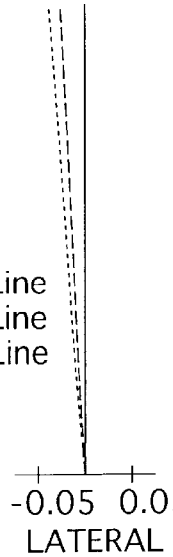
Figure 8C:
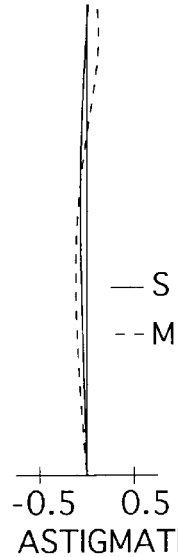
Figure 8D:
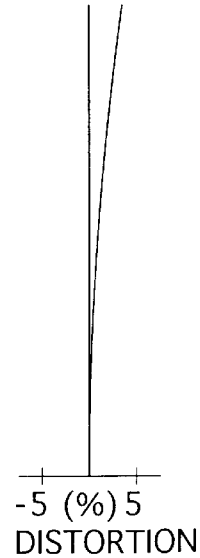
Figures 9, 10A, 10B, 10C, 10D:
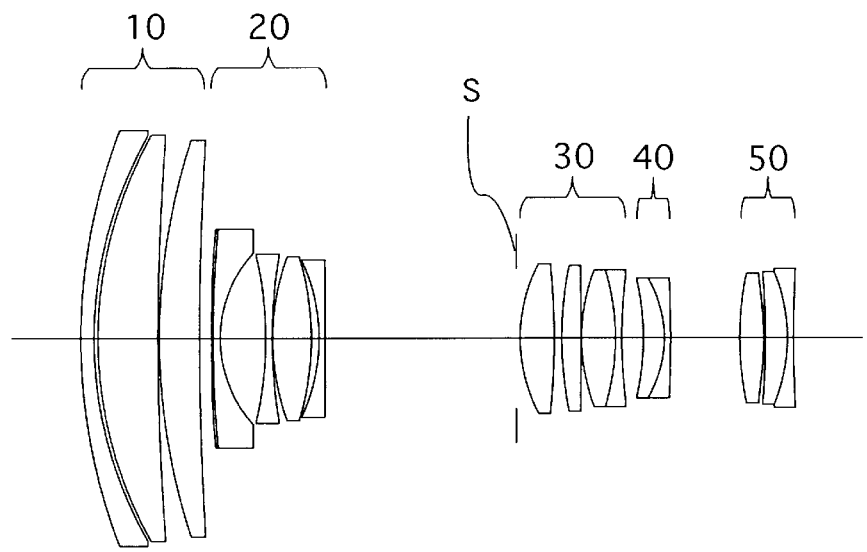
FIG. 9 is a lens arrangement of a high-magnification zoom lens system at the short focal length extremity according to a third embodiment of the present invention.
FIGS. 10A, 10B, 10C and 10D show aberrations occurred in the lens arrangement shown in FIG. 9.
Figure 11A:
FIGS. 11A, 11B, 11C and 11D show aberrations occurred in the lens arrangement shown in FIG. 9 at an intermediate focal length.
Figure 11B:
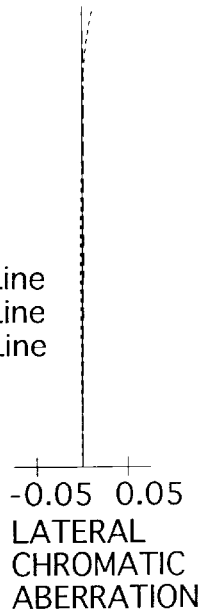
Figure 11C:
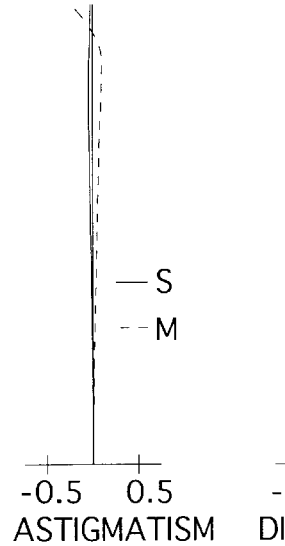
Figure 11D:
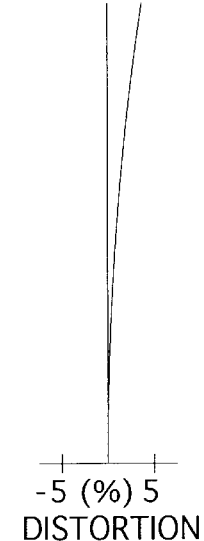
Figure 12A:
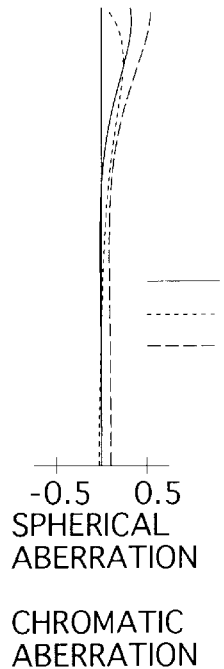
FIGS. 12A, 12B, 12C and 12D show aberrations occurred in the lens arrangement shown in FIG. 9 at the long focal length extremity.
Figure 12B:
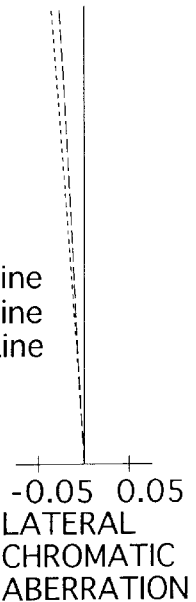
Figure 12C:
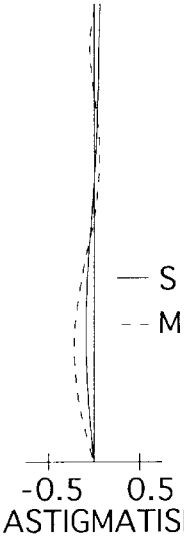
Figure 12D:
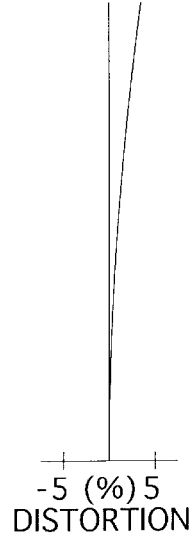

FIG. 9 is a lens arrangement of a high-magnification zoom lens system at the short focal length extremity, according to the third embodiment of the present invention. FIGS. 10A through 10D show aberrations occurred in the lens arrangement shown in FIG. 9. FIGS. 11A through 11D show aberrations occurred in the lens arrangement shown in FIG. 9 at an intermediate focal length. FIGS. 12A through 12D show aberrations occurred in the lens arrangement shown in FIG. 9 at the long focal length extremity. Table 3 shows the numerical values of the third embodiment. The basic lens arrangement of the third embodiment is the same as the second embodiment except that surface Nos. 16 through 22 constitute the positive third lens group 30, surface Nos. 23 through 25 constitute the negative fourth lens group 40, and surface Nos. 26 through 30 constitute the positive fifth lens group 50.

An aspherical surface is formed on a lens element in each of the negative second lens group 20 and the positive fifth lens group 50. The diaphragm S is provided 0.50 in front (object side) of the third lens group 30 (surface No. 16).

TABLE 3

| Surface No. | r | d | $N_d$ | $v_d$ |
|---|---|---|---|---|
| 1 | 82.547 | 1.90 | 1.80518 | 25.4 |
| 2 | 58.563 | 0.59 | — | — |
| 3 | 59.351 | 8.70 | 1.49700 | 81.6 |
| 4 | 377.853 | 0.20 | — | — |
| 5 | 91.611 | 5.82 | 1.61800 | 63.4 |
| 6 | 470.826 | 1.73-31.75-68.46 | — | — |
| 7* | 412.572 | 0.23 | 1.52700 | 43.7 |
| 8 | 174.440 | 1.00 | 1.83481 | 42.7 |
| 9 | 18.715 | 6.55 | — | — |
| 10 | −53.431 | 0.90 | 1.80400 | 46.6 |
| 11 | 71.781 | 0.10 | — | — |
| 12 | 35.713 | 5.51 | 1.84666 | 23.8 |
| 13 | −41.640 | 1.11 | — | — |
| 14 | −27.213 | 0.90 | 1.81600 | 46.6 |
| 15 | −1378.747 | 28.19-14.03-2.50 | — | — |
| 16 | 23.498 | 4.90 | 1.49700 | 81.6 |
| 17 | −108.947 | 1.08 | — | — |
| 18 | 52.830 | 2.75 | 1.69680 | 55.5 |
| 19 | −841.364 | 0.10 | — | — |
| 20 | 28.546 | 4.84 | 1.48749 | 70.2 |
| 21 | −34.777 | 0.90 | 1.80518 | 25.4 |
| 22 | 71.541 | 3.12-4.35-4.62 | — | — |
| 23 | −37.646 | 3.00 | 1.80518 | 25.4 |
| 24 | −17.278 | 0.90 | 1.80400 | 46.6 |
| 25 | −197.007 | 9.95-4.81-3.31 | — | — |
| 26 | −46.773 | 3.45 | 1.58913 | 61.2 |
| 27* | −44.018 | 0.25 | — | — |
| 28 | −117.020 | 3.20 | 1.58144 | 40.7 |
| 29 | −25.026 | 0.90 | 1.83481 | 42.7 |
| 30 | 199.309 | — | — | — |

$F_{NO}$ = 1:3.5 − 5.4 − 6.3
f = 29.00 − 84.99 − 290.01 (Zoom Ratio = 10.0)
W = 38.1 − 13.8 − 4.1
$f_B$ = 38.73 − 73.48 − 90.56
*designates the aspherical surface which is rotationally symmetrical with respect to the optical axis.

| Surface No. | K | A4 | A6 | A8 | A10 |
|---|---|---|---|---|---|
| 7 | 0.00 | $0.24927 \times 10^{-5}$ | $-0.12052 \times 10^{-7}$ | $0.38422 \times 10^{-10}$ | $-0.36849 \times 10^{-13}$ |
| 18 | 0.00 | $-0.82665 \times 10^{-5}$ | $-0.11692 \times 10^{-7}$ | $-0.60296 \times 10^{-10}$ | $-0.19044 \times 10^{-12}$ |
| 26 | 0.00 | $-0.48064 \times 10^{-4}$ | $-0.77508 \times 10^{-7}$ | $0.14467 \times 10^{-9}$ | $-0.11280 \times 10^{-12}$ |

Aspherical surface data (the aspherical surface coefficients not indicated are zero (0.00)):

| Surface No. | K | A4 | A6 | A8 | A10 |
|---|---|---|---|---|---|
| 7 | 0.00 | $0.56809 \times 10^{-5}$ | $-0.10451 \times 10^{-7}$ | $0.31855 \times 10^{-10}$ | $-0.43235 \times 10^{-15}$ |
| 27 | 0.00 | $0.31362 \times 10^{-4}$ | $-0.72291 \times 10^{-8}$ | $0.49945 \times 10^{-9}$ | $-0.15318 \times 10^{-11}$ |

[Embodiment 4]

Figure 13:
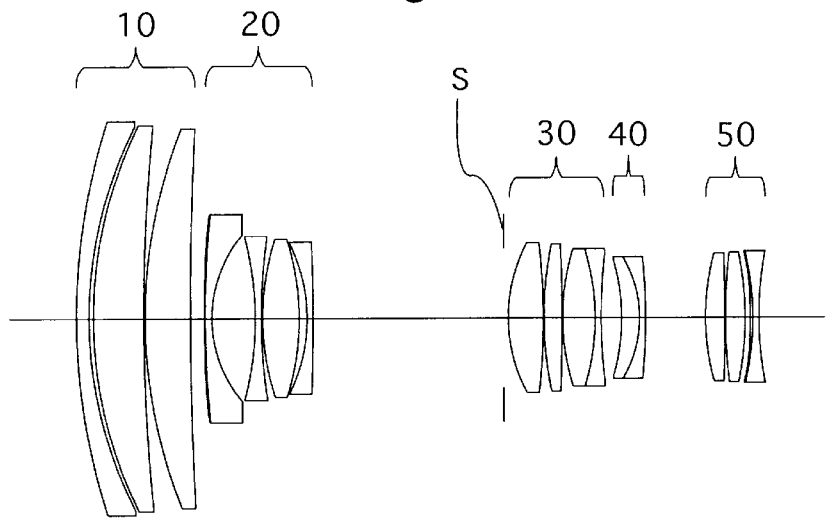
FIG. 13 is a lens arrangement of a high-magnification zoom lens system at the short focal length extremity according to a fourth embodiment of the present invention.
Figure 14A:
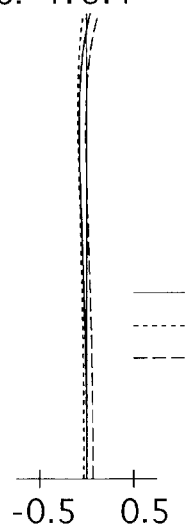
FIGS. 14A, 14B, 14C and 14D show aberrations occurred in the lens arrangement shown in FIG. 13.
Figure 14B:
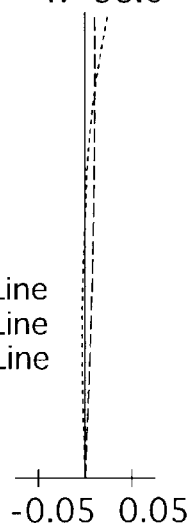
Figure 14C:
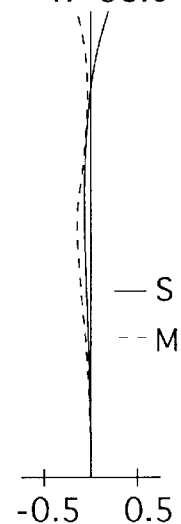
Figure 14D:
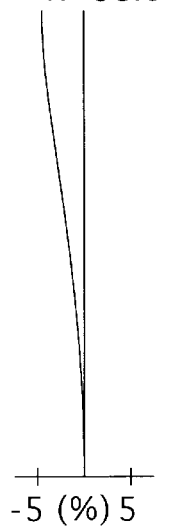
Figure 15A:
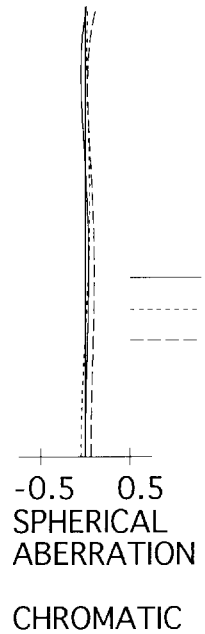
FIGS. 15A, 15B, 15C and 15D show aberrations occurred in the lens arrangement shown in FIG. 13 at an intermediate focal length.
Figure 15B:
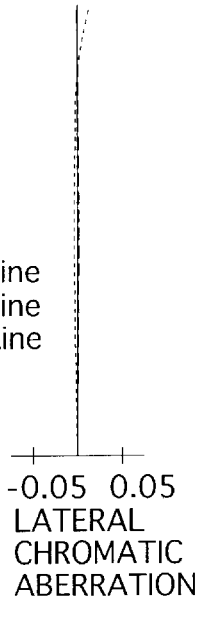
Figure 15C:
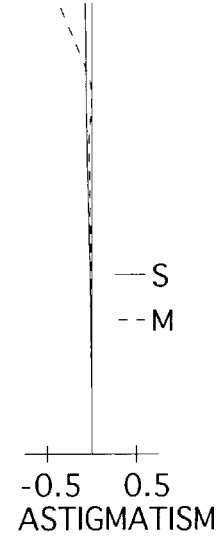
Figure 15D:
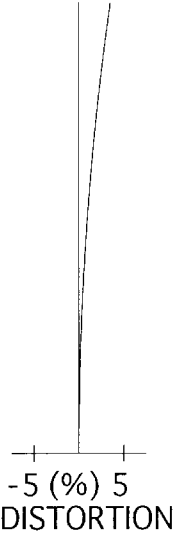
Figure 16A:
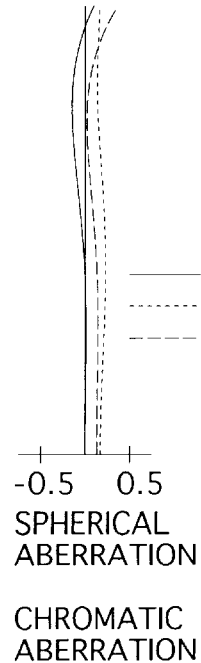
FIGS. 16A, 16B, 16C and 16D show aberrations occurred in the lens arrangement shown in FIG. 13 at the long focal length extremity.
Figure 16B:
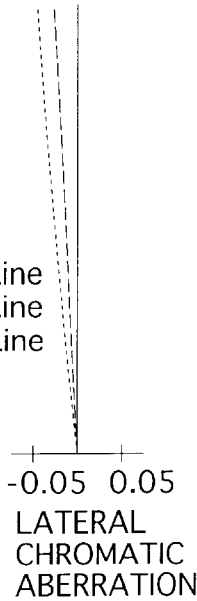
Figure 16C:
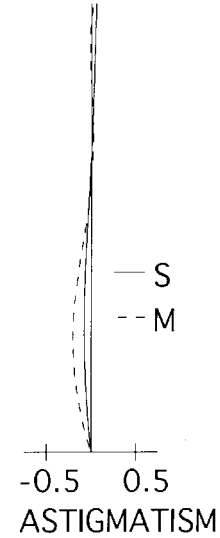
Figure 16D:
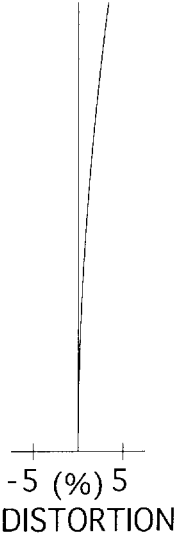
Figure 19A:
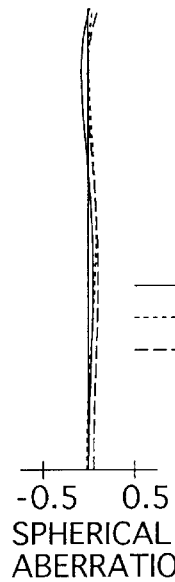
FIGS. 19A, 19B, 19C and 19D show aberrations occurred in the lens arrangement shown in FIG. 17 at an intermediate focal length.
Figure 19B:
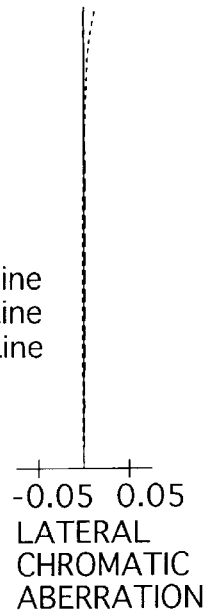
Figure 19C:
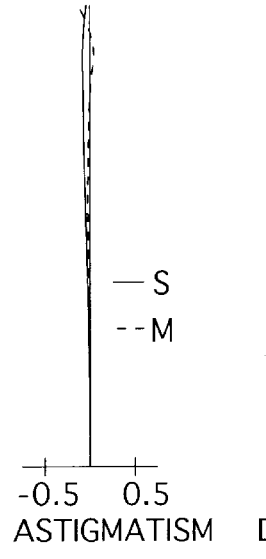
Figure 19D:
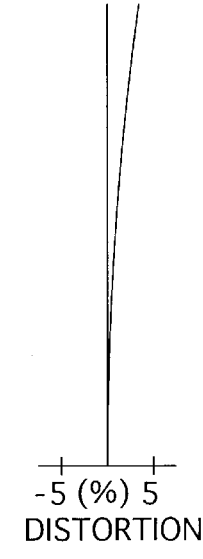
Figure 20A:
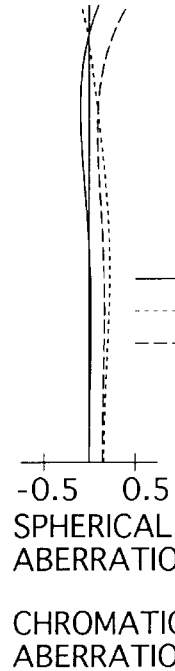
FIGS. 20A, 20B, 20C and 20D show aberrations occurred in the lens arrangement shown in FIG. 17 at the long focal length extremity.
Figure 20B:
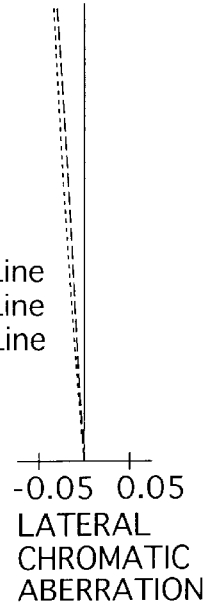
Figure 20C:
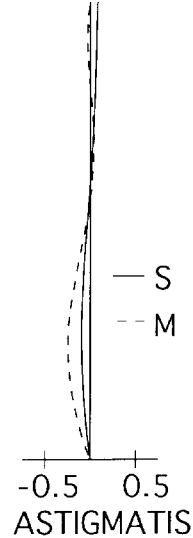
Figure 20D:
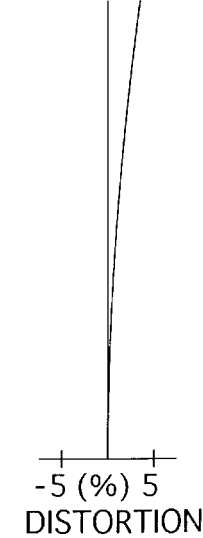

FIG. 13 is a lens arrangement of a high-magnification zoom lens system at the short focal length extremity, according to the fourth embodiment of the present invention. FIGS. 14A through 14D show aberrations occurred in the lens arrangement shown in FIG. 13. FIGS. 15A through 15D show aberrations occurred in the lens arrangement shown in FIG. 13 at an intermediate focal length. FIGS. 16A through 16D show aberrations occurred in the lens arrangement shown in FIG. 13 at the long focal length extremity. Table 4 shows the numerical values of the fourth embodiment. The basic lens arrangement of the fourth embodiment is the same as the third embodiment except that surface Nos. 26 through 32 constitute the positive fifth lens group 50. An aspherical surface is formed on a lens element in each of the negative second lens group 20 and the positive fifth lens group 50. The diaphragm S is provided 0.70 in front (object side) of the third lens group 30 (surface No. 16).

TABLE 4

| Surface No. | r | d | $N_d$ | $v_d$ |
|---|---|---|---|---|
| 1 | 96.838 | 1.85 | 1.80518 | 25.4 |
| 2 | 63.737 | 0.65 | — | — |
| 3 | 65.276 | 7.53 | 1.49700 | 81.6 |
| 4 | 284.820 | 0.20 | — | — |
| 5 | 76.237 | 6.83 | 1.60311 | 60.7 |
| 6 | 537.185 | 2.13-33.07-69.57 | — | — |
| 7* | 289.300 | 0.10 | 1.52700 | 0.00 |
| 8 | 153.000 | 1.00 | 1.83481 | 42.7 |
| 9 | 19.429 | 6.55 | — | — |
| 10 | −48.068 | 0.90 | 1.80400 | 46.6 |
| 11 | 81.414 | 0.24 | — | — |
| 12 | 39.545 | 5.43 | 1.84666 | 23.8 |
| 13 | −39.545 | 1.18 | — | — |
| 14 | −25.736 | 0.90 | 1.81600 | 46.6 |
| 15 | −277.688 | 29.26-14.73-2.79 | — | — |
| 16 | 23.932 | 5.30 | 1.49700 | 81.6 |
| 17 | −98.408 | 1.10 | — | — |
| 18 | 54.826 | 2.69 | 1.71300 | 53.9 |
| 19 | −298.996 | 0.10 | — | — |
| 20 | 35.144 | 4.86 | 1.48749 | 70.2 |
| 21 | −35.144 | 0.90 | 1.80518 | 25.4 |
| 22 | 80.938 | 3.08-4.23-4.46 | — | — |
| 23 | −31.703 | 2.70 | 1.80518 | 25.4 |
| 24 | −17.896 | 0.90 | 1.80400 | 46.6 |
| 25 | −96.812 | 8.99-2.66-1.10 | — | — |
| 26 | 36.657 | 2.90 | 1.48749 | 70.2 |
| 27 | −371.449 | 0.10 | — | — |
| 28 | 84.167 | 2.95 | 1.58144 | 40.7 |
| 29 | −48.824 | 0.77 | — | — |
| 30* | −92.951 | 0.40 | 1.52700 | 0.0 |
| 31 | −42.595 | 0.90 | 1.83481 | 42.7 |
| 32 | 52.699 | — | — | — |

$F_{NO} = 1:3.4 - 5.2 - 6.2$
$f = 29.00 - 85.01 - 290.01$ (Zoom Ratio = 10.0)
$W = 38.0 - 13.8 - 4.1$
$f_B = 38.80 - 72.42 - 91.53$
*designates the aspherical surface which is rotationally symmetrical with respect to the optical axis.

Aspherical surface data (the aspherical surface coefficients not indicated are zero (0.00)):

| Surface No. | K | A4 | A6 | A8 | A10 |
|---|---|---|---|---|---|
| 7 | 0.00 | $0.54748 \times 10^{-5}$ | $-0.37507 \times 10^{-8}$ | $0.22344 \times 10^{-11}$ | $0.76798 \times 10^{-13}$ |
| 30 | 0.00 | $-0.44553 \times 10^{-4}$ | $0.50534 \times 10^{-8}$ | $-0.62677 \times 10^{-9}$ | $0.31540 \times 10^{-11}$ |

[Embodiment 5]

FIG. 17 is a lens arrangement of a high-magnification zoom lens system at the short focal length extremity, according to the fifth embodiment of the present invention. FIGS. 18A through 18D show aberrations occurred in the lens arrangement shown in FIG. 17. FIGS. 19A through 19D show aberrations occurred in the lens arrangement shown in FIG. 17 at an intermediate focal length. FIGS. 20A through 20D show aberrations occurred in the lens arrangement shown in FIG. 17 at the long focal length extremity. Table 5 shows the numerical values of the fifth embodiment. The basic lens arrangement of the fifth embodiment is the same as the fourth embodiment except that upon zooming from the short focal length extremity to the long focal length extremity, the negative second lens group 20 first moves toward the object and thereafter moves back (U-turns) toward the image.

An aspherical surface is formed on a lens element in each of the negative second lens group 20 and the positive fifth lens group 50. The diaphragm S is provided 0.50 in front (object side) of the third lens group 30 (surface No. 16).

TABLE 5

| Surface No. | r | d | $N_d$ | $\nu_d$ |
|---|---|---|---|---|
| 1 | 93.961 | 1.85 | 1.80518 | 25.4 |
| 2 | 62.290 | 0.74 | — | — |
| 3 | 64.574 | 7.37 | 1.49700 | 81.6 |
| 4 | 259.015 | 0.20 | — | — |
| 5 | 76.364 | 6.90 | 1.60311 | 60.7 |
| 6 | 690.057 | 2.11-30.89-69.54 | — | — |
| 7* | 252.543 | 0.12 | 1.52700 | 0.00 |
| 8 | 162.000 | 1.00 | 1.83481 | 42.7 |
| 9 | 18.830 | 6.47 | — | — |
| 10 | −48.908 | 0.90 | 1.80400 | 46.6 |
| 11 | 65.265 | 0.10 | — | — |
| 12 | 36.636 | 5.52 | 1.84666 | 23.8 |
| 13 | −40.799 | 1.22 | — | — |
| 14 | −25.965 | 0.90 | 1.81600 | 46.6 |
| 15 | −214.548 | 28.11-13.87-2.50 | — | — |
| 16 | 24.338 | 5.16 | 1.49700 | 81.6 |
| 17 | −84.572 | 0.62 | — | — |
| 18 | 54.199 | 2.64 | 1.71300 | 53.9 |
| 19 | −377.410 | 0.10 | — | — |
| 20 | 36.643 | 4.67 | 1.48749 | 70.2 |
| 21 | −32.804 | 0.90 | 1.80518 | 25.4 |
| 22 | 95.185 | 2.96-4.12-4.28 | — | — |
| 23 | −33.042 | 2.80 | 1.80518 | 25.4 |
| 24 | −17.653 | 0.90 | 1.80400 | 46.6 |
| 25 | −106.916 | 9.53-2.90-1.25 | — | — |
| 26 | 37.654 | 3.40 | 1.51633 | 64.1 |
| 27 | −89.322 | 0.10 | — | — |
| 28 | 228.826 | 2.60 | 1.58144 | 40.7 |
| 29 | −55.281 | 0.97 | — | — |
| 30* | −93.328 | 0.35 | 1.52700 | 43.7 |
| 31 | −41.572 | 0.90 | 1.83481 | 42.7 |
| 32 | 58.361 | — | — | — |

$F_{NO}$ = 1:3.5 - 5.4 - 6.2
f = 29.00 - 85.01 - 290.00 (Zoom Ratio = 10.0)
W = 38.0 - 13.8 - 4.1
$f_B$ = 39.08 - 75.61 - 90.63
*designates the aspherical surface which is rotationally symmetrical with respect to the optical axis.

Aspherical surface data (the aspherical surface coefficients not indicated are zero (0.00)):

| Surface No. | K | A4 | A6 | A8 | A10 |
|---|---|---|---|---|---|
| 7 | 0.00 | $0.53779 \times 10^{-5}$ | $-0.12115 \times 10^{-7}$ | $0.40615 \times 10^{-10}$ | 0.00 |
| 30 | 0.00 | $-0.42226 \times 10^{-4}$ | $0.15022 \times 10^{-7}$ | $-0.73053 \times 10^{-9}$ | $0.34799 \times 10^{-11}$ | lens group 50. The diaphragm S is provided 0.50 in front (object side) of the third lens group 30 (surface No. 18).

TABLE 6

| Surface No. | r | d | $N_d$ | $\nu_d$ |
|---|---|---|---|---|
| 1 | 123.929 | 1.90 | 1.80518 | 25.4 |
| 2 | 74.565 | 1.58 | — | — |
| 3 | 76.288 | 7.83 | 1.49700 | 81.6 |
| 4 | −1540.221 | 0.20 | — | — |
| 5 | 69.789 | 6.64 | 1.59240 | 68.3 |
| 6 | 331.278 | 1.65-27.73-62.41 | — | — |
| 7* | 971.756 | 0.45 | 1.52700 | 43.7 |
| 8 | 971.756 | 1.00 | 1.83481 | 42.7 |
| 9 | 20.067 | 5.70 | — | — |
| 10 | −78.398 | 0.90 | 1.80400 | 46.6 |
| 11 | 66.921 | 0.10 | — | — |
| 12 | 31.935 | 5.05 | 1.84666 | 23.8 |
| 13 | −61.396 | 2.81 | — | — |
| 14 | −27.179 | 0.90 | 1.83481 | 42.7 |
| 15 | 42.221 | 0.00 | — | — |
| 16 | 42.221 | 2.46 | 1.80518 | 25.4 |
| 17 | 255.886 | 24.31-12.31-2.50 | — | — |
| 18 | 22.677 | 5.25 | 1.49700 | 81.6 |
| 19 | −77.660 | 0.13 | — | — |
| 20 | 48.465 | 2.92 | 1.48749 | 70.2 |
| 21 | −502.332 | 0.10 | — | — |
| 22 | −29.958 | 5.13 | 1.51633 | 64.1 |
| 23 | −27.943 | 0.90 | 1.80518 | 25.4 |
| 24 | 154.378 | 3.88-4.86-5.08 | — | — |
| 25 | −32.254 | 3.00 | 1.80518 | 25.4 |
| 26 | −15.039 | 0.90 | 1.80400 | 46.6 |
| 27 | −178.526 | 8.74-3.33-1.72 | — | — |
| 28 | 42.962 | 3.60 | 1.58913 | 61.2 |
| 29* | −57.412 | 1.03 | — | — |
| 30 | −130.394 | 0.90 | 1.83481 | 42.7 |
| 31 | 90.699 | — | — | — |

$F_{NO}$ = 1:3.5 - 5.5 - 6.3
f = 29.00 - 85.01 - 290.00 (Zoom Ratio = 10.0)
W = 37.9 - 13.8 - 4.1
$f_B$ = 39.08 - 75.61 - 90.63
*designates the aspherical surface which is rotationally symmetrical with respect to the optical axis.

[Embodiment 6]

Figure 21:
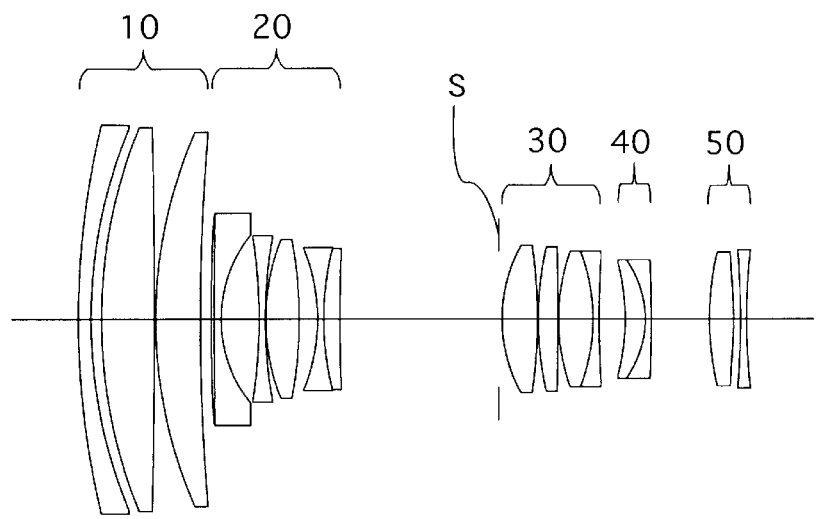
FIG. 21 is a lens arrangement of a high-magnification zoom lens system at the short focal length extremity according to a sixth embodiment of the present invention.
Figure 22A:
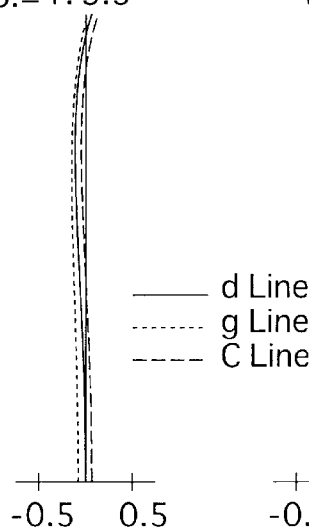
FIGS. 22A, 22B, 22C and 22D show aberrations occurred in the lens arrangement shown in FIG. 21.
Figure 22B:
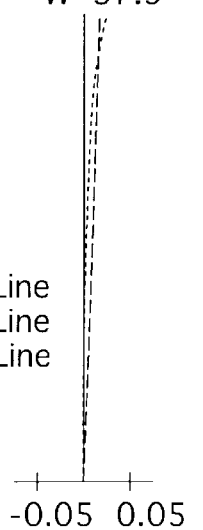
Figure 22C:
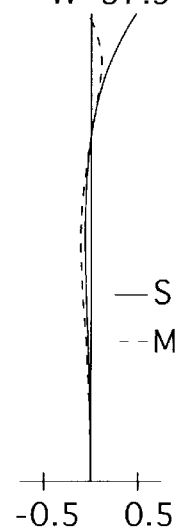
Figure 22D:
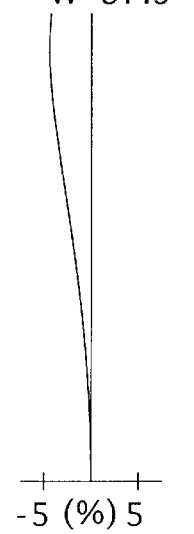
Figure 23A:
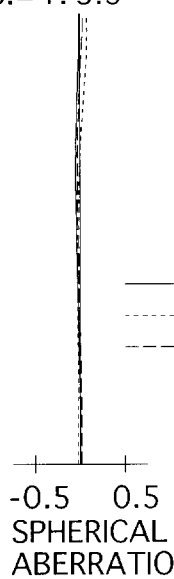
FIGS. 23A, 23B, 23C and 23D show aberrations occurred in the lens arrangement shown in FIG. 21 at an intermediate focal length.
Figure 23B:
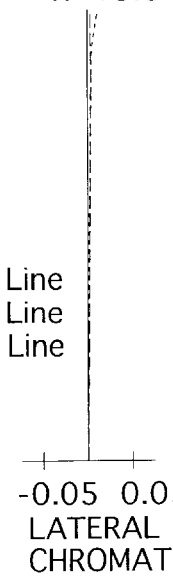
Figure 23C:
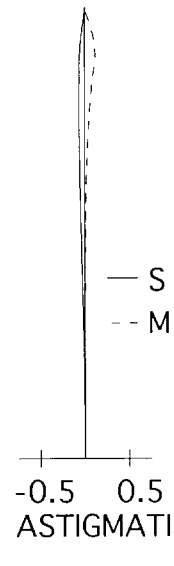
Figure 23D:
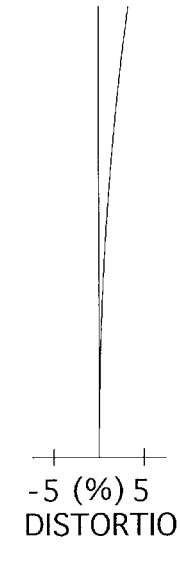
Figure 24A:
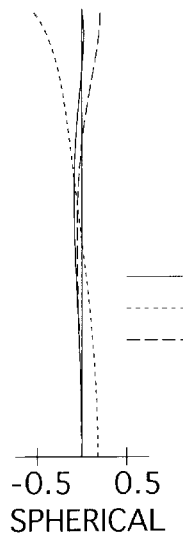
FIGS. 24A, 24B, 24C and 24D show aberrations occurred in the lens arrangement shown in FIG. 21 at the long focal length extremity.
Figure 24B:
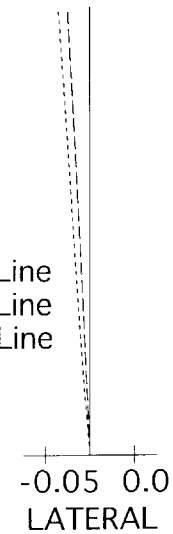
Figure 24C:
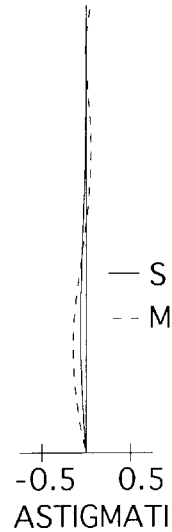
Figure 24D:
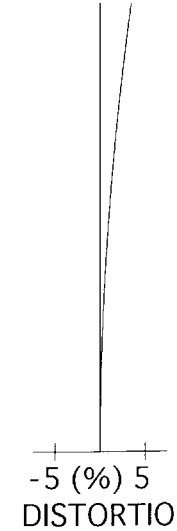

FIG. 21 is a lens arrangement of a high-magnification zoom lens system at the short focal length extremity, according to the sixth embodiment of the present invention. FIGS. 22A through 22D show aberrations occurred in the lens arrangement shown in FIG. 21. FIGS. 23A through 23D show aberrations occurred in the lens arrangement shown in FIG. 21 at an intermediate focal length. FIGS. 24A through 24D show aberrations occurred in the lens arrangement shown in FIG. 21 at the long focal length extremity. Table 6 shows the numerical values of the sixth embodiment. The basic lens arrangement of the sixth embodiment is the same as the fourth embodiment except that surface Nos. 7 through 17 constitute the negative second lens group 20, surface Nos. 18 through 24 constitute the positive third lens group 30, surface Nos. 25 through 27 constitute the negative fourth lens group 40, and the surface Nos. 28 through 31 constitute the positive fifth lens group 50.

An aspherical surface is formed on a lens element in each of the negative second lens group 20 and the positive fifth Aspherical surface data (the aspherical surface coefficients not indicated are zero (0.00)):

| Surface No. | K | A4 | A6 | A8 | A10 |
|---|---|---|---|---|---|
| 7 | −1.0 | $0.60871 \times 10^{-5}$ | $-0.74293 \times 10^{-8}$ | $0.21207 \times 10^{-10}$ | 0.00 |
| 29 | −1.0 | $0.36092 \times 10^{-4}$ | $0.80903 \times 10^{-8}$ | $0.24403 \times 10^{-9}$ | 0.00 |

The numerical values of each condition for each embodiment are shown in Table 7.

TABLE 7

| | Embod. 1 | Embod. 2 | Embod. 3 | Embod. 4 | Embod. 5 | Embod. 6 |
|---|---|---|---|---|---|---|
| Cond. (1) | 0.159 | 0.169 | 0.178 | 0.232 | 0.160 | 0.220 |
| Cond. (2) | 0.774 | 0.767 | 0.777 | 0.764 | 0.773 | 0.853 |

TABLE 7-continued

| | Embod. 1 | Embod. 2 | Embod. 3 | Embod. 4 | Embod. 5 | Embod. 6 |
|---|---|---|---|---|---|---|
| Cond. (3) | −5.255 | −5.211 | −5.288 | −5.114 | −5.243 | −5.972 |
| Cond. (4) | 0.850 | 0.851 | 0.872 | 0.850 | 0.839 | 0.869 |
| Cond. (5) | 0.798 | 0.796 | 0.821 | 0.812 | 0.821 | 0.812 |
| Cond. (6) | 0.068 | 0.068 | 0.060 | 0.074 | 0.073 | 0.057 |
| Cond. (7) | 1.864 | 1.851 | 1.635 | 1.623 | 1.598 | 1.565 |
| Cond. (8) | 63.400 | 63.400 | 81.600 | 81.600 | 81.600 | 81.600 |

As can be understood from Table 7, the numerical values of the first through sixth embodiments satisfy each of conditions (1) through (8). Furthermore, as can be understood from the aberration diagrams, the various aberrations at each focal length can be adequately corrected.

According to the above description, a high-magnification zoom lens system, which has a short overall length, achieves a zoom ratio of about 10.0, and has an angle of view $2\omega$ of about 76°, can be obtained.

What is claimed is:

1. A high-magnification zoom lens system comprising a positive first lens group, a negative second lens group, a positive third lens group, a negative fourth lens group, and a positive fifth lens group, in this order from an object, wherein upon zooming from the short focal length extremity to the long focal length extremity, at least said positive first lens group, said positive third lens group, said negative fourth lens group, and said positive fifth lens group move from the image side toward the object side;

wherein said high-magnification zoom lens system satisfies the following conditions:

$$0.65 < (fw*ft)^{1/2}/f1 < 0.95$$

$$-7.0 < (fw*ft)^{1/2}/f2 < -4.8$$

$$0.80 < X4/X5 < 0.95$$

wherein
fw designates the focal length of the entire high-magnification zoom lens system at the short focal length extremity;
ft designates the focal length of the entire high-magnification zoom lens system at the long focal length extremity;
f1 designates the focal length of said positive first lens group;
f2 designates the focal length of said negative second lens group;
X4 designates the traveling distance of said negative fourth lens group upon zooming from the short focal length extremity to the long focal length extremity; and
X5 designates the traveling distance of said positive fifth lens group upon zooming from the short focal length extremity to the long focal length extremity.

2. A high-magnification zoom lens system according to claim 1, satisfying the following condition:

$$0 < (L_{(1-3)W} + X3 - X1)/fw < 0.3$$

wherein
$L_{(1-3)W}$ designates the distance from the most image-side surface of said positive first lens group to the most object-side surface of said positive third lens group, at the short focal length extremity;
X3 designates the traveling distance of said positive third lens group upon zooming from the short focal length extremity to the long focal length extremity; and
X1 designates the traveling distance of said positive first lens group upon zooming from the short focal length extremity to the long focal length extremity.

3. A high-magnification zoom lens system according to claim 1, wherein said high-magnification zoom lens system performs focusing from an object at infinity to a close-distance object by moving said negative second lens group toward the object, and wherein said high-magnification zoom lens system satisfies the following conditions:

$$0.75 < |m2t| < 1.0$$

$$0.05 < D_{1W}/fw < 0.10$$

wherein
m2t designates the lateral magnification of said negative second lens group at the long focal length extremity;
fw designates the focal length of the entire high-magnification zoom lens system at the short focal length extremity; and
$D_{1W}$ designates the distance from the most image-side surface of said positive first lens group to the most object-side surface of said negative second lens group at the short focal length extremity.

4. A high-magnification zoom lens system according to claim 1, wherein in at least two of the negative second lens group, the positive third lens group and the positive fifth lens group comprise a lens element on which an aspherical surface is formed.

5. A high-magnification zoom lens system according to claim 1, satisfying the following conditions:

$$1.0 < f3*N_{3-1}/R_{3-1} < 2.0$$

$$62 < \nu_{3-1}$$

wherein
f3 designates the focal length of said positive third lens group;
$N_{3-1}$ designates the refractive index, with respect to the d-line, of the most object-side lens element of said positive third lens group;
$R_{3-1}$ designates the radius of curvature of the object-side surface of the most object-side lens element of said positive third lens group; and
$\nu_{3-1}$ designates the Abbe number of the most object-side lens element of said positive third lens group.

* * * * *